United States Patent Office

3,536,494
Patented Oct. 27, 1970

3,536,494
METHOD OF PRODUCING A MULTI-VITAMIN FOOD ENRICHMENT COMPOSITION
Henry J. Johnson, 6217 W. 64th Terrace, Mission, Kans. 66202
No Drawing. Continuation of application Ser. No. 243,181, Dec. 3, 1962. This application Apr. 7, 1967, Ser. No. 629,103
Int. Cl. A23l *1/30;* A61k *15/12*
U.S. Cl. 99—11
5 Claims

ABSTRACT OF THE DISCLOSURE

A multi-vitamin enriched composition for food products such as milk containing a significant quantity of water and including a quantity of a vitamin such as riboflavin difficultly soluble in water embedded in a sufficient amount of lactose to render the riboflavin soluble in the food product. Other vitamins such as niacin and thiamine hydrochloride may be incorporated into the composition. The enrichment in composition is prepared by admixing the various ingredients introducing sufficient water only to saturate the composition, followed by drying and screening thereof.

---

This application is a continuation of application Ser. No. 243,181, filed Dec. 3, 1962, under the same title and now abandoned.

This invention relates to a multi-vitamin enrichment composition for food products and particularly food such as milk, as well as to a unique method of treating normally water insoluble vitamins so that the same may be introduced into foods, including milk, without affecting the taste of the food and with the vitamins being fully and completely dispersed therein.

Many problems have been encountered in the past in the enrichment of milk and other food products with water insoluble vitamins such as riboflavin and niacin. The National Nutritional Council has established recommended daily requirements for a number of different vitamins and minerals and, therefore, in order to assure that persons receive the required amounts of these materials, even on an unbalanced diet from a vitamin and mineral standpoint, it has been the practice in certain food industries to enrich products with the necessary vitamins. In the enrichment of milk, for example, most dairies introduce vitamins A and D into the product, but enrichment with riboflavin, niacin and thiamine hydrochloride has not received widespread acceptance heretofore because of the difficulty of incorporating these materials into the milk product without affecting the taste of the milk. This is due to the fact that no method had thus far been developed for solubilizing either riboflavin or niacin. Of these two vitamins, riboflavin is the most difficult to use for enrichment purposes because of its medicinal flavor. The undissolved vitamin particles tend to float rather than dissolve in the milk. During drinking of the enriched milk, when the undissolved or imperfectly dispersed particles come in contact with the taste buds on the tongue, they impart a strong medicinal taste. Although niacin is generally classed as a water soluble vitamin, it has been found to possess a pronounced electrostatic charge, which not only inihibits penetration of moisture into the vitamin particles but also causes the powder to agglomerate or roll up into tiny beadlets. These beadlets become suspended in the milk and impart a bitter and sour taste as they come in contact with the taste buds on the consumer's tongue.

Many milk processors have refused to provide full vitamin and mineral enrichment of their products because of the difficulty of dispersing the vitamins in the liquid and the unfavorable taste imparted thereto, especially after the milk has been permitted to stand for a few days before being consumed. Deterioration of the taste of the milk caused by the vitamin and enrichment materials has been found to progress very rapidly as the milk is permitted to stand and this effective shortening of the shelf life of the product has militated against widespread adoption of enrichment of milk and other foods with multi-vitamins.

Completely aside from the nutritional advantages of vitamin fortified compositions, there is an economic advantage in the milk or food processor being able to introduce any desired admixture of vitamins into his formulations or milk because he can sell his product for an increased price greater than the actual cost of the multi-vitamins when he enriches the food with a full line of vitamins and minerals.

Most multi-vitamin enrichment compositions now employed for fortifying milk and similar products involve an admixture of thiamine hydrochloride, riboflavin and niacin which are packaged as a dry mix and sold in predetermined weights for incorporation into relatively large amounts of the liquid material. In order to provide full enrichment of the milk, it is also conventional to include iron and iodine compounds with the vitamins. In accordance with one prior procedure, the processor was instructed to introduce the package of dry vitamin and mineral fortification powder into several gallons of milk in a suitable container and then agitate vigorously for at least 10 minutes. The fortified milk was then poured into a large vat of several hundred gallons of milk and the milk further agitated to attempt to solubilize or completely disperse the vitamins and minerals in the liquid. Although the thiamine hydrochloride, which is relatively water soluble, did disperse in the milk, the undissolved particles of riboflavin and niacin continued to float in the milk and therefore caused an off-flavor as they came in contact with the taste buds on the tongue. Additionally, a certain proportion of the particles of the water insoluble vitamins tended to cling to the sides of the tank or to float on the top surface of the liquid because of the incompatibility of the vitamins with the milk.

In an effort to overcome the problem of nonuniform disperson of the vitamins in the milk or similar products, the instructions have more recently been altered to state that the combination vitamin and mineral enrichment powder should be introduced into only a sufficient amount of milk, when the enrichment composition is added thereto, to produce a thin paste. The directions then call for addition of the paste to the vat of milk with continued agitation for an extended period. This procedure still did not overcome the problems noted.

It has been determined that riboflavin is not only insoluble in water and thereby insoluble or indispersible in milk, but also has the characteristic of swelling in volume to at least six or seven times as great as the initial state thereof, thereby compounding the problem of effecting dissolution or dispersion of the vitamin in a product such as milk containing a high proportion of water. Since riboflavin imparts a bitter medicinal flavor to milk, unless completely dissolved or dispersed therein, it can be seen that one of the major difficulties with paste enrichment compositions has been the floating particles of vitamins in the milk which are readily sensed by the consumer's taste buds, making the product highly undesirable from the standpoint of saleability. Manifestly, the public will not buy milk that tastes like medicine. Furthermore, with the tendency of the milk to become unpalatable increasing progressively as the milk sits on the shelf, it has been necessary for the dairies to pick up unsold containers of enriched milk approximately seven days after processing thereof.

Niacin is also relatively insoluble in water containing products but for a different reason than the insoluble properties of riboflavin. Particles of niacin have a strong electrostatic charge thereon and when the vitamin material is introduced into a liquid such as milk at a temperature of about 38° to 40° F. (the temperature at which milk is normally processed), the niacin rolls up into very small beads which tend to float in the milk and remain therein as undissolved beadlets containing substantially pure, highly concentrated vitamin material. These beads retain the electrostatic charge thereon and repel penetration of water into the same, precluding dissolution of the vitamin in the liquid. Since niacin has a very sour acid taste, although not quite as medicinal as riboflavin, the beadlets of niacin in the milk produce a taste problem that increases with the age of the milk.

It is also well known that water insoluble products are poorly and slowly absorbed through the walls of the small intestines and through the walls of the blood vessels in the intestinal wall. Thus, a large proportion of undissolved particles of vitamin materials in milk will be lost without passing into the blood stream of the person drinking the milk. Furthermore, because of the poor assimilation of these water insoluble substances, only a limited amount of the vitamins present in the milk will actually be available to the person unless the vitamins are fully dissolved in the liquid product.

It is, therefore, the primary object of the present invention to overcome the problems set forth above by providing a multi-vitamin food enrichment composition which will readily dissolve in food such as milk, without affecting the taste of the product and with the vitamins permanently remaining in solution or complete dispersion throughout the milk. Also, an important object in this respect is to provide a food enrichment composition having the properties above, which may be packaged in convenient preweighed form and added to the product requiring fortification by simply introducing the composition into the milk, followed by a very short period of agitation.

Another important object of the invention is to provide a method of processing normally water insoluble vitamins to produce a dry powder that is fully soluble in milk or similar food products containing water, with only very simple and rapid processing steps being required, utilizing a minimum of equipment and with fully reproducible results being obtained at all times.

Also, a significant object of the invention is to provide a method of producing a multi-vitamin food enrichment composition wherein the normally water insoluble vitamins are added to a carrier therefor that is readily soluble in the milk to assure equal dissolution of the vitamins in the milk or liquid containing water ultimately to be enriched with the vitamin composition.

A still further important object of the invention is to provide a process as described, wherein uniform solubilization of the normally water insoluble vitamins in the carrier therefor is obtained by adding only a sufficient amount of water to the admixture of vitamins and carrier to saturate the same and permit homogenization thereof by a simple mixing and blending operation.

Briefly, the present method of processing normally water insoluble vitamins to cause the same to readily dissolve in milk or other water containing products, involves adding one or more water insoluble vitamins to a quantity of an organic, nontoxic, particulate carrier therefor that is readily and highly soluble in the milk or food products, followed by addition of only a sufficient amount of water to the admixture to substantially saturate the composition. Next, the moist mass is subjected to a mixing operation to form a substantially homogeneous product. The water is evaporated from the composition to produce a granular material and after proper screening thereof, the enrichment composition may be packaged in suitable air and moisture impervious packets for ultimate introduction into a predetermined volume of milk or other food product.

As previously explained, it is desirable that the food or milk be fortified with vitamins, A, D, $B_1$, $B_2$, niacin, iron and iodine. It is preferred that the vitamins be processed and packaged in an air and water impervious container, such as conventional laminated plastic-foil-paper packet, while the minerals are prepared and packaged in a separate, similar packet for independent introduction into the milk or other food product.

Processing of the riboflavin and niacin in accordance with the preferred operating conditions involves adding predetermined amounts of the vitamins to an organic, nontoxic, particulate, carbohydrate carrier such as lactose into a suitable receptacle. Although the thiamine hydrochloride is substantially water soluble and presents no substantial problems with respect to dissolution thereof in milk, it is convenient to incorporate this vitamin into the carbohydrate containing carrier along with the normally water insoluble riboflavin and niacin to simplify preparation of the final enrichment composition. The dry vitamins and the carbohydrate containing carrier are thoroughly mixed and blended to obtain relatively uniform intermingling of the ingredients, whereupon, sufficient water is added to the admixture only to saturate the same. The moist mass is then thoroughly mixed until an homogenous admixture is obtained with the vitamins being thoroughly penetrated by or embedded in the highly water soluble carrier. The water is then removed from the homogenous mass by a conventional air drying operation at a temperature not exceeding about 110° F. to avoid altering the characteristics of the vitamins and thereby producing a granular enrichment composition. Since only a very small amount of water is employed in saturating the vitamins and the carrier with liquid, the granules resulting from drying of the admixture are of very soft texture requiring only screening of the material to produce a dry, free-flowing powder that may be introduced directly into a food product such as milk. Good results are obtained by passing the granules through a 60 mesh screen to assure relatively uniform particle size.

The multi-vitamin product described above, may then be admixed with the vitamin D composition prepared in accordance with the disclosure of U.S. Pat. No. 3,072,533. A dry vitamin A may also be added to the mixture described above. After admixing of the dry ingredients, the product is preweighed and individually packaged in laminated packets, as described. The amount of vitamin material in each packet is preferably of a weight to fortify a prescribed volume of milk with vitamins of at least certain minimum concentrations. It has been found convenient to provide packages for fortifying either 100 or 500 gallon lots of milk.

A specific example of a preferred multi-vitamin food enrichment composition embodying the inventive concepts thereof, is as follows:

Add successively:

1.94 lbs. of thiamine hydrochloride
3.78 lbs. of riboflavin
18.92 lbs. of niacin
29.36 lbs. of lactose.

Admix the materials thoroughly in a dough mixer type of mixing apparatus. 5 lbs. of water is added to the dry ingredients to saturate the materials and the mixing is continued until homogenization of the material is obtained. The mixing step normally requires about 45 min. The product is removed from the mixing vessel and dried at an elevated temperature not exceeding about 110° F., whereupon the material is passed through a 60 mesh screen and preweighed and prepackaged as described.

2,000 packets may be weighed out of the formulation set forth above with each packet being designed to enrich 100 gallons of milk with at least 1 mg. of thiamine, 2 mg. riboflavin and 10 mg. niacin per quart.

The quantities above provide, by weight, 3.6% of thiamine hydrochloride, 7.0% riboflavin, 35.0% niacin, and 54.4% lactose, but it is to be understood that the quantities of these vitamins may be varied in accordance with the vitamin formulation and fortification required or desired for the milk or other food product. In any event, however, the carrier should comprise at least about 40% by weight of the entire dry admixture to obtain proper dissolution of the enrichment composition in the milk.

The multi-vitamin enrichment composition processed in accordance with the procedure above, is fully soluble in milk without imparting any foreign flavor to the milk and without decreasing the shelf life thereof. This is accomplished by securing complete solubility of all the vitamins and minerals.

Although the process described above relates particularly to simultaneous treatment of more than one water insoluble vitamin material, it is to be recognized that the method is fully applicable to processing of only one vitamin and with the individual vitamin and carrier products being admixed and preweighed prior to packaging of the same in a single container. Also, the processing method described herein has application to the production of multi-vitamin or single vitamin products which may be incorporated into capsules for administration to humans or animals as therapeutic agents. The free-flowing characteristics of the multi-vitamin powders are especially useful in this respect during the step of filling the capsules with the powdered product. Since riboflavin, to a large extent, and niacin, to a somewhat lesser extent, are very difficult to introduce into small capsules or similar units because of the tacky and sluggish nature of the product, treatment of the same in accordance with the present procedure results in a nonbridging material that will rapidly flow into the capsules prepared and filled in fully automated production equipment.

Having thus described the invention, what is claimed as new and desired to be secured by Letters Patent is:

1. A process of producing a vitamin enrichment composition for milk and other food products containing a significant quantity of water, said process comprising the steps of:
    admixing a quantity of particulate riboflavin which is normally difficultly soluble in water, with a sufficient amount of a particulate carrier consisting essentially of lactose to solubilize the riboflavin, said carrier comprising at least about 40% by weight of the admixture;
    adding only a sufficient amount of water to the admixture to saturate the same and produce a moist mass; and
    subjecting the homogenous product to a heated atmosphere for a sufficient period of time to effect removal of substantially all of said quantity of water therefrom to form a particulate enrichment composition, the temperature of said heated atmosphere being at a level to effect removal of said water without adversely affecting said riboflavin.

2. A process as set forth in claim 1 wherein is included the steps of:
    admixing the riboflavin and said carrier after addition of said quantity of water thereto until a homogenous mass is obtained and screening the enrichment composition after removal of said quantity of water therefrom to produce a relatively fine powder.

3. A process as set forth in claim 1 wherein is provided at least about 54.5% by weight of lactose for each 7% by weight of riboflavin.

4. A process as set forth in claim 1 wherein is provided the steps of adding particulate thiamine hydrochloride and niacin to the admixture.

5. A process as set forth in claim 4 wherein is included in percent by weight, about 3.6% of thiamine hydrochloride, 7% of riboflavin, 35% of niacin and 54.4% of lactose.

References Cited

UNITED STATES PATENTS

| | | | |
|---|---|---|---|
| 3,116,204 | 12/1963 | Siegel et al. | 99—11 X |
| 3,243,347 | 3/1966 | Kracauer | 99—11 X |
| 2,413,055 | 12/1946 | Leviton | 424—252 |

LIONEL M. SHAPIRO, Primary Examiner

U.S. Cl. X.R.
99—54; 424—252